US008762891B2

(12) United States Patent
Wang et al.

(10) Patent No.: US 8,762,891 B2
(45) Date of Patent: Jun. 24, 2014

(54) RELATIONSHIP-BASED AND CONTEXT-BASED USER INTERFACES FOR EXCHANGING DATA

(75) Inventors: Winston Wang, Bellevue, WA (US); Robert Buck, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 883 days.

(21) Appl. No.: 12/368,965

(22) Filed: Feb. 10, 2009

(65) Prior Publication Data
US 2009/0300549 A1    Dec. 3, 2009

Related U.S. Application Data

(63) Continuation of application No. 12/146,346, filed on Jun. 25, 2008, now abandoned.

(60) Provisional application No. 61/057,779, filed on May 30, 2008.

(51) Int. Cl.
*G06F 3/048*     (2013.01)
*G06F 3/0481*    (2013.01)
*G06F 17/30*     (2006.01)
*H04L 29/08*     (2006.01)
*G06Q 10/10*     (2012.01)
*H04N 21/4786*   (2011.01)

(52) U.S. Cl.
CPC ............ *G06F 3/048* (2013.01); *G06F 3/0481* (2013.01); *G06F 17/30873* (2013.01); *G06F 17/30017* (2013.01); *H04L 67/10* (2013.01); *H04L 67/104* (2013.01); *G06Q 10/10* (2013.01); *H04N 21/4786* (2013.01)

USPC .......... 715/853; 715/716; 715/751; 715/764; 715/810; 715/835; 715/864

(58) Field of Classification Search
CPC . G06F 3/048; G06F 3/0481; G06F 17/30873; G06F 17/30017; H04L 67/10; H04L 67/104; G06Q 10/10; H04N 21/4786
USPC .......... 715/853, 716, 751, 764, 810, 835, 864
See application file for complete search history.

(56) References Cited

U.S. PATENT DOCUMENTS

| | | | | |
|---|---|---|---|---|
| 7,213,206 | B2 * | 5/2007 | Fogg | 715/706 |
| 7,343,365 | B2 * | 3/2008 | Farnham et al. | 715/853 |
| 7,689,682 | B1 * | 3/2010 | Eldering et al. | 709/223 |
| 2005/0198153 | A1 * | 9/2005 | Keohane et al. | 709/206 |
| 2006/0010395 | A1 * | 1/2006 | Aaltonen | 715/779 |
| 2006/0052998 | A1 * | 3/2006 | Michelman | 703/22 |

(Continued)

*Primary Examiner* — Patrick Riegler
(74) *Attorney, Agent, or Firm* — Perkins Coie LLP

(57) ABSTRACT

A system and method for presenting an interface to a user of a mobile device, the interface allowing a user to identify and select data that is to be transmitted to another mobile device. In some embodiments, the interface generated by the system allows the user to select data for transmission based on relationship associations. The relationship associations, for example, may include pre-defined groupings of data that are tailored to a specific relationship between the user and another person. Accordingly, the user may employ the interface to quickly locate data that would be appropriate to transmit given the particular relationship between the user and the person to receive the data. In some embodiments, the interface generated by the system allows the user to select data for transmission based on context associations. Individual context associations may contain a smaller subset of data corresponding to a specific relationship association.

23 Claims, 16 Drawing Sheets

(56) References Cited

U.S. PATENT DOCUMENTS

| | | | |
|---|---|---|---|
| 2006/0053388 A1* | 3/2006 | Michelman | 715/775 |
| 2006/0053389 A1* | 3/2006 | Michelman | 715/775 |
| 2006/0184997 A1* | 8/2006 | La Rotonda et al. | 726/2 |
| 2006/0265383 A1* | 11/2006 | Pezaris et al. | 707/10 |
| 2007/0035513 A1* | 2/2007 | Sherrard et al. | 345/157 |
| 2007/0129112 A1* | 6/2007 | Tarn | 455/566 |
| 2007/0162953 A1* | 7/2007 | Bolliger et al. | 725/142 |
| 2007/0245006 A1* | 10/2007 | Lehikoinen et al. | 709/223 |
| 2007/0255785 A1* | 11/2007 | Hayashi et al. | 709/204 |
| 2007/0276735 A1* | 11/2007 | Naito | 705/14 |
| 2007/0294366 A1* | 12/2007 | Ozzie et al. | 709/217 |
| 2008/0021870 A1* | 1/2008 | Birnbaum et al. | 707/3 |
| 2008/0027909 A1* | 1/2008 | Gang et al. | 707/3 |
| 2008/0172628 A1* | 7/2008 | Mehrotra et al. | 715/771 |
| 2008/0294655 A1* | 11/2008 | Picault et al. | 707/100 |
| 2009/0080698 A1* | 3/2009 | Mihara et al. | 382/103 |
| 2009/0119245 A1* | 5/2009 | Lynch | 707/1 |
| 2009/0199254 A1* | 8/2009 | White et al. | 725/110 |
| 2009/0241064 A1* | 9/2009 | Harris | 715/841 |
| 2009/0248794 A1* | 10/2009 | Helms et al. | 709/203 |
| 2009/0249355 A1* | 10/2009 | Kaarela et al. | 719/313 |
| 2009/0287783 A1* | 11/2009 | Beare et al. | 709/206 |
| 2009/0292762 A1* | 11/2009 | Mettala et al. | 709/203 |
| 2009/0299963 A1* | 12/2009 | Pippuri | 707/3 |
| 2009/0300493 A1* | 12/2009 | Hamilton et al. | 715/706 |
| 2010/0057696 A1* | 3/2010 | Miyazawa et al. | 707/3 |
| 2010/0205179 A1* | 8/2010 | Carson et al. | 707/740 |

* cited by examiner

RELATIONSHIP-BASED AND CONTEXT-BASED USER INTERFACES FOR EXCHANGING DATA

CROSS-REFERENCE TO RELATED APPLICATIONS

This application is a continuation of U.S. application Ser. No. 12/146,346, filed Jun. 25, 2008 now abandoned, which claims the benefit of U.S. Provisional Application No. 61/057,779, entitled RELATIONSHIP-BASED AND CONTEXT-BASED USER INTERFACES FOR EXCHANGING DATA, filed May 30, 2008.

BACKGROUND

Today's portable electronic devices may store a myriad of different types of data. Personal cell phones, for example, may store contact information, including postal addresses, e-mail addresses, and phone numbers of friends, family members, or business associates. Today's cell phones may also capture picture or video files and store the files in onboard memory. Further, cell phones and other types of mobile devices are also typically equipped with web browsers and other Internet-enabled tools that allow a user to download music files, video files, and other types of media. In addition to being data stores, many modern mobile devices have software and hardware for communicating over short ranges with one another. A pair of mobile-device users may exchange contact information using a wireless Bluetooth link, for example, between their corresponding devices.

Prior to transmitting any data, a user typically must locate and select the appropriate data on the device that is to be transmitted. In many instances, this may be a cumbersome task. The user may need to navigate through several menus before finding the desired data. For example, if the user wants to exchange an electronic business card, the user typically needs to access an e-mail program, locate a menu containing the business card, and filter through the information in this menu to locate the business card. If this same user would also like to exchange additional data, the user would typically need to navigate through a different set of menus, filtering through various data before finding the desired data. In some instances, a mobile device user may experience a cognitive overload when navigating menus and filtering through the data contained in these menus. For example, the data may not be well organized or a user may need to open a particular file before being able to determine if it is appropriate to send.

DETAILED DESCRIPTION

Figure 1:
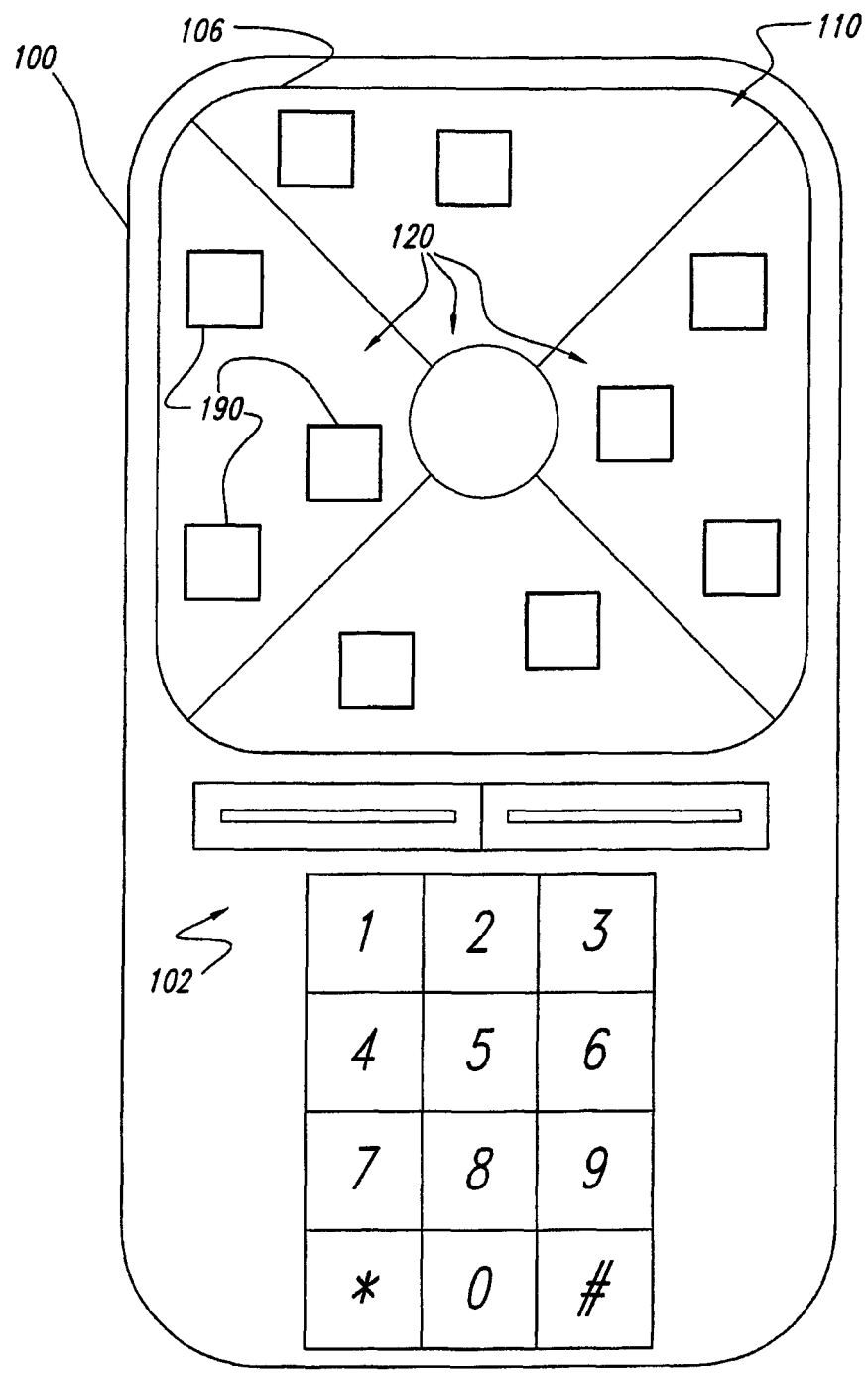
FIG. 1 illustrates a representative user interface at a mobile-device display having relationship and context associations of data.

A system and method for presenting an interface to a user of a mobile device, the interface allowing a user to identify and select data that is to be transmitted to another mobile device is disclosed. In some embodiments, the interface generated by the system allows the user to select data for transmission based on relationship associations. The relationship associations, for example, may be pre-defined (either system-defined or user-defined), and express the user's perceived relationship with the person intended to receive certain data. Certain data or groups of data subsist within each relationship association and, accordingly, the user may employ the interface to quickly locate data that would be appropriate to transmit given the particular relationship between the user and the person intended to receive the data. In some embodiments, the interface generated by the system further allows the user to select data for transmission based on context associations. Individual context associations may contain a smaller subset of data corresponding to a specific relationship association. The use of relationship and/or context associations offers mobile device users with a less complicated, less cumbersome, and more intuitive interface to transmit or exchange data between mobile devices.

The term "mobile device" may encompass any of a myriad of communication devices such as cellular phones, personal digital assistants, portable computers, mini computers, programmable consumer electronics, and so on. Such mobile devices may include a central processing unit, memory, input devices (e.g., keypads and input buttons) and output devices (e.g., display devices). Mobile devices may also be configured to store a myriad of different types of data and data files. For example, mobile device may be configured to receive IP-based services and accordingly store multimedia or other types of data that may be downloaded from the World Wide Web. Mobile devices may also store data that has been manually entered into the mobile device (e.g., via a keypad) or received in a wireless communication from another mobile device. In some embodiments, mobile devices may also include additional types of hardware/software for capturing photos, audio, and/or video and for storing such files at onboard memory. For example, mobile devices may include digital camera functionality that allows a user to take pictures or capture video.

Mobile devices may also include hardware and operating instructions stored in memory for wirelessly transmitting and receiving data according to one or more wireless protocols. Such protocols include short range protocols (e.g., Near Field Communication (NFC), Bluetooth, Wi-Fi, Ultra-wideband, and ZigBee) and radio-access network protocols (e.g., GSM, GPRS, EDGE, UMTS and CDMA). In general, the following disclosure describes wireless communications in the context of short range communications employing short range protocols. In a particular embodiment, such short range communications may be carried out by "tapping" a mobile device with another mobile device, details of which are disclosed in International Application No. PCT/US2008/054793 entitled "DATA EXCHANGE INITIATED BY TAPPING DEVICES," filed Feb. 22, 2008 and incorporated herein by reference. In other embodiments, however, the following disclosure also applies to wireless communications that employ long range protocols and/or a computer network (e.g., a telecommunications and/or an IP network) as an intermediary link between two or more mobile devices. Further, wireless communications may also take place between a mobile device and a stationary device (e.g., a desktop computer).

Various embodiments of the disclosure will now be described. The following description provides specific details for a thorough understanding and an enabling description of these embodiments. One skilled in the art will understand, however, that the embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the disclosure.

FIG. 1 illustrates a mobile device 100 and components of the mobile device, including a keypad 102, a display 106, and a root user interface 110 that is generated by the system and output at the display 106. The root interface 110 displays a variety of associations that are selectable by a user and which correspond to data that is stored on the mobile device 100. More specifically, the root interface 110 presents relationship associations 120 (depicted as sectors) and context associations 190 (depicted as boxes). The root interface may present the relationship associations and context associations in a myriad of ways. Indeed, all relationship associations need not be presented simultaneously in a single display 106 as shown in FIG. 1. Further, all context relationships need not be presented in a single display. A user may hide and unhide certain relationship associations and/or context associations. A user may identify stored data for transmission to another user device by selecting a specific relationship association or a specific context association. The user, for example, may employ the keypad 102 to select a relationship and/or context association. In some embodiments, the display 106 may be a touchscreen that enables a user to select a specific relationship association and/or context association with a fingertip or stylus. After selecting the association, a secondary user interface may be presented on the display 106, and the secondary interface may include icons and/or text representative of the appropriate data. The user may again employ the keypad 102, touchscreen, touchpad, or stylus and select particular data within the secondary interface that is to be transmitted to the other user's device.

In some embodiments, a user may automatically select one or more appropriate receiving devices by bringing the user's mobile device within proximity of the receiving device(s) or by "tapping" the user's mobile device with the receiving devices. In other embodiments, the user may employ the keypad 102, touchscreen, touchpad, or stylus to manually select devices that should receive data. After the appropriate data and receiving device(s) have been identified, the data may be automatically transmitted to another device. In other embodiments, the appropriate data and receiving device(s) may be identified and the user may again transmit selected data by entering a command via the keypad 102, touchscreen, touchpad, or stylus.

Relationship Associations

Figure 2:
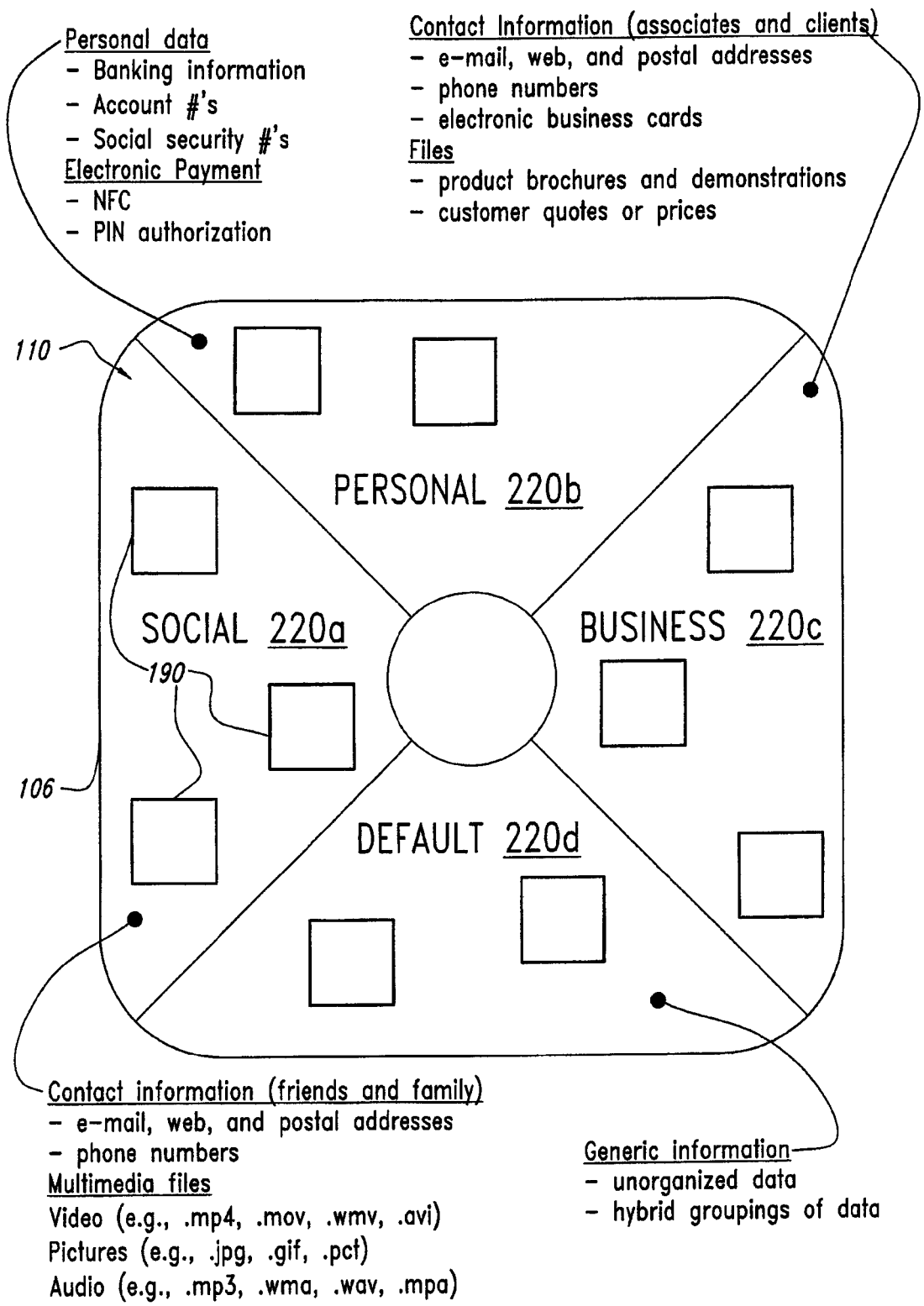
FIG. 2 illustrates relationship associations of data in more detail.

FIG. 2 illustrates the root interface 110 generated by the system and containing Social, Personal, Business, and Default relationship associations 220a-d, respectively. A user may select individual relationship associations 220a-d, for example, by touching the display 106 at a portion of a sector that is not occupied by one of the context associations 190. The user may also select individual relationship associations by touching an appropriate key on a the mobile device keypad, such as a "2" for "personal," "4" for "business," "6" for "default," and "8" for "social." If the mobile device has a touchpad, such as a touch-sensitive disk, or a stylus, the user may manipulate the touchpad or stylus to select the appropriate sector. It will be appreciated that the touchpad may allow a user to quickly select the desired sector by making circular motions on the touchpad, the circular motion causing the corresponding sectors to be highlighted in turn with the motion traced on the touchpad. As will be described in additional detail herein, the selection of one of the four relationship indicators narrows the data that is presented to a user, allowing the user to more quickly locate data for transmission to another user.

Figure 3:
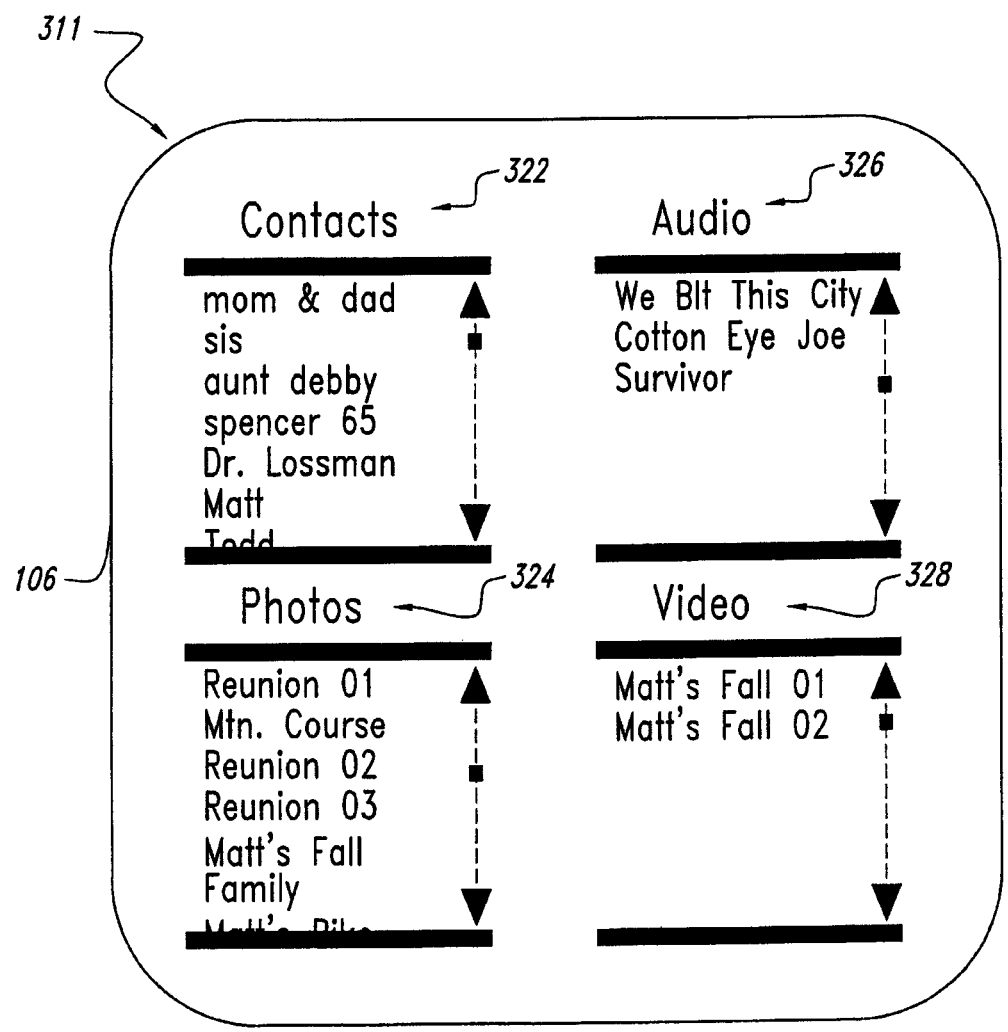
FIGS. 3-6 illustrate various secondary user interfaces that are presented at the mobile-device display when a relationship association is selected.

When the Social association 220a is selected by a user, the system presents a secondary interface to the user that displays data that is appropriate for exchanging with friends and family on the mobile device 100. For example, the user may select the Social association 220a to transfer pictures of family, favorite songs, and/or entertaining videos. FIG. 3 illustrates an embodiment of a secondary user interface 311 that is presented on the display 106 when the Social association 220a is selected. The secondary interface 311 displays a Contacts menu 322, a Photos menu 324, an Audio menu 326, and a Video menu 328. The Contacts menu 322 may include filenames associated with email addresses, phone numbers, and other types of contact information relating to friends and family. The Photos menu 324, Audio menu 326, and Video menu 328 may contain, respectively, photos, songs, and video that would be appropriate to send to friends and family of the user. Such data may be explicitly categorized by the user to identify the data as appropriate for friends and family, may be implicitly identified by the user by a previous transmission of the data to friends or family, or may be intuited by the system based on keyword analysis (e.g., pictures saved with the title "Mom and Dad July 4th"). In additional or alternative examples, the secondary interface 311 may present different configurations of menus and filenames. For example, secondary interfaces may show graphical icons representative of filenames or data and/or or may contain root menus that lead to sub-menus presented in other types of user interfaces.

Figure 4:
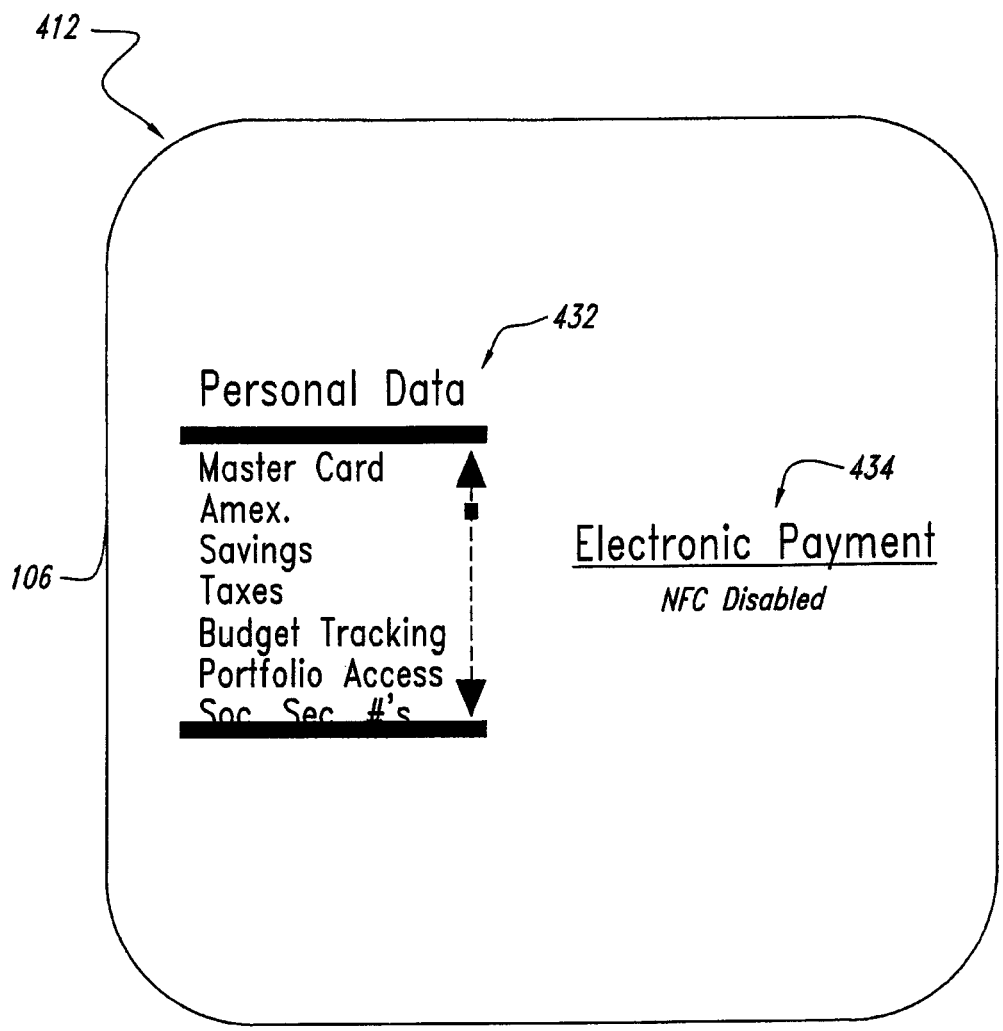

Referring again to FIG. 2, when the Personal association 220b is selected by a user, the system presents a secondary interface to the user that displays data that the user would typically consider to be private or sensitive. For example, the Personal association 220b may contain accounting information, electronic payment features, and other types of personal data. FIG. 4 illustrates an embodiment of a secondary user interface 412 that is presented on the display 106 when the Personal association 220b is selected. The secondary interface 412 displays a Personal Data menu 432 and an Electronic Payment icon 434. The Personal Data menu 432 may include data corresponding to banking statements, account information, and various other types of personal information. Such data may be explicitly categorized by the user to identify the data as personal, may be implicitly identified by the user by a previous transmission of the data to a bank or other similar business, or may be intuited by the system based on keyword analysis (e.g., spreadsheets entitled "2007 taxes"). The Electronic Payment icon 434 may be selected to activate various electronic payment feature of the mobile device 100. For example, the mobile device 100 may be configured to act as an NFC-based electronic payment token and a user may select the Electronic Payment icon 434 to enable/disable this feature. In several embodiments, access to the secondary interface 412 may be password protected or include various security features. For example, a user may need to provide a password or a biometric input (e.g., a fingerprint) at the mobile device 100 before the system will present the secondary interface 412 to the user.

Figure 5:
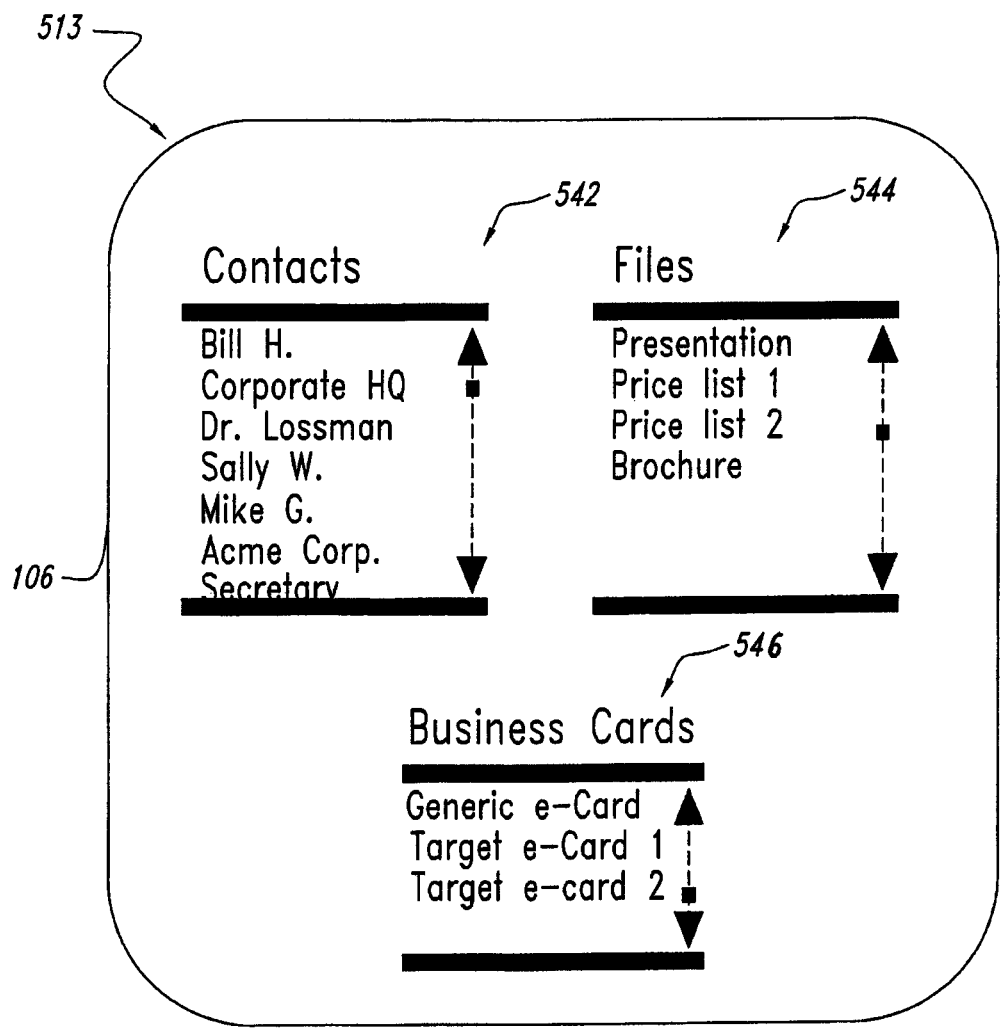

Referring again to FIG. 2, when the Business association 220c is selected by a user, the system presents a secondary interface that displays data on the mobile device 100 appropriate for exchanging with coworkers, clients, or other business associates. FIG. 5 illustrates an embodiment of a secondary user interface 513 that is presented on the display 106 when the Business association 220c is selected. The secondary interface 513 displays a Contacts menu 542, a Files menu 544, and a Business Card menu 546, all of which contain information that may be used in a business context. Such information may be explicitly categorized by the user to identify the data as business related, may be implicitly identified by the user by a previous transmission of the data to a business associate, or may be intuited by the system based on keyword analysis (e.g., by the inclusion of a company name in contact data). The Contacts menu 542 includes a list of business contacts, such as coworkers or clients. In some embodiments, some of the contacts listed in the Contacts menu may also be presented in the contacts menu of other relationship associations, such as the Social association. For example, the contact "Dr. Lossman" is presented in the Contacts menu 322 and the Contacts menu 542. The Files menu 544 may contain data (e.g., spreadsheets, text documents, or presentation files) corresponding to business brochures, product demonstrations, and customer quotes or prices. The Business Card menu 546 may include the user's electronic business cards, such as a default or generic business cards and business cards targeted to specific clients. For example, the user may own several companies and the targeted business cards could contain information corresponding to a specific company.

Figure 6:
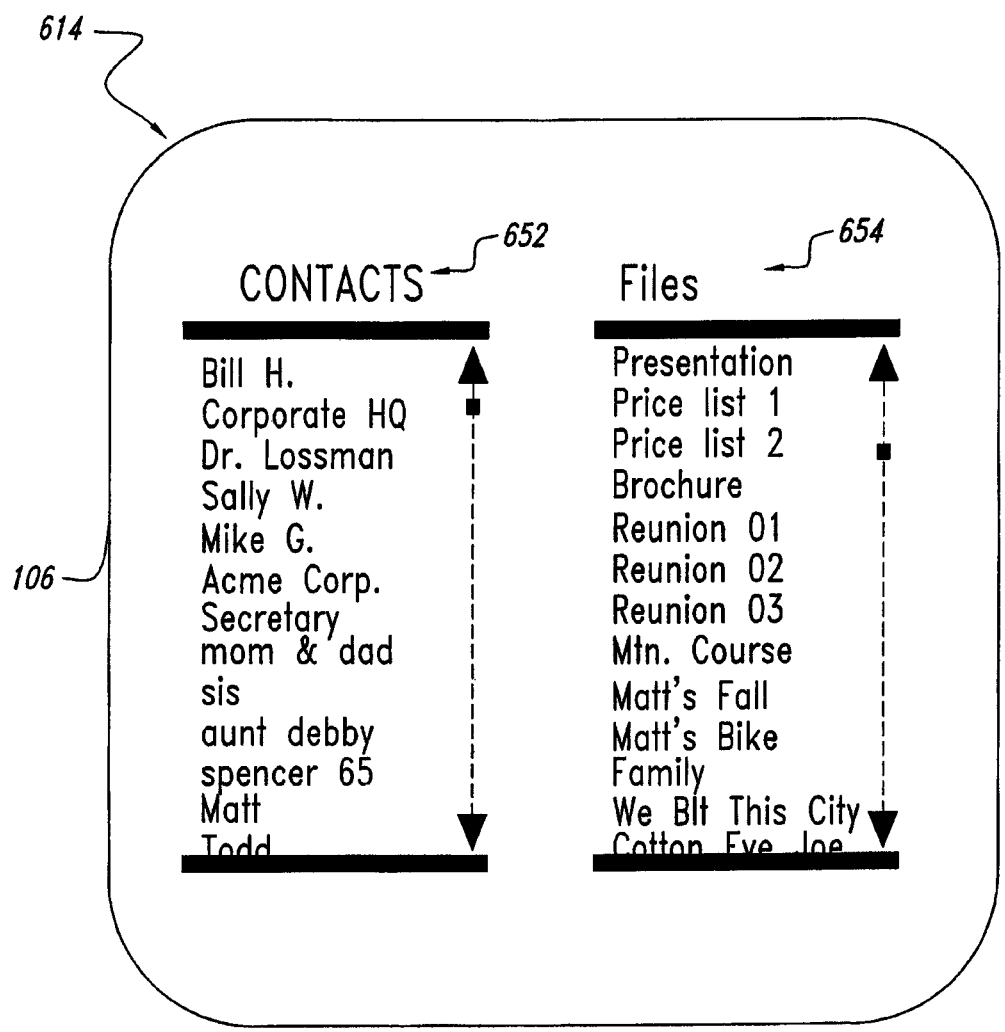

Referring again to FIG. 2, when the Default association 220d is selected by a user, the system presents a secondary interface to the user that displays generic associations of data and/or unassociated data. FIG. 6 illustrates a secondary user interface 614 that is presented on the display 106 when the Default association 220d is selected. The secondary interface 612 displays a Contacts menu 652 and a Files menu 654. The Contacts menu 642 includes all contact information associated with the user. The Files menu 654 includes all of the filenames that are accessible by the user. The Default association 220d therefore allows a user to access any of the data that is available on the user's device.

In some embodiments, the system allows a user to customize the menus of the secondary interface 614 or add or modify additional relationship associations 220. For example, a user may define new menus, associate data with these menus, and create a new relationship association that may be presented as a new sector at the root interface 110. In some embodiments, a user may employ the Default association 220d and the corresponding secondary interface 614 to build a hybrid grouping of data having a specific context.

When categorizing data for inclusion in one or more of the relationship associations, a user may forego establishing a context relationship for certain data, and choose instead to categorize certain data at a file level by simply associating each file with a particular relationship association. For example, a user may manually associate a spreadsheet entitled "2008 Sales Leads" with the Business association, and thereby make such spreadsheet selectable without referring to a context association. Similarly, a user may also categorize data at a directory level, such as by associating a file folder or folders in a file management system with a particular relationship association. For example, a user may manually associate a file folder that is entitled "music" with the Personal association. The system would apply the categorization to any of the files that are contained with the designated file folder or folders. A user may also categorize data based on a filename extension. For example, a user may manually associate any files having an ".mp3" extension with the Personal association, since such files are typically music files. It will be appreciated that other categorizations may be allowed by the system.

Context Associations

Figure 7:
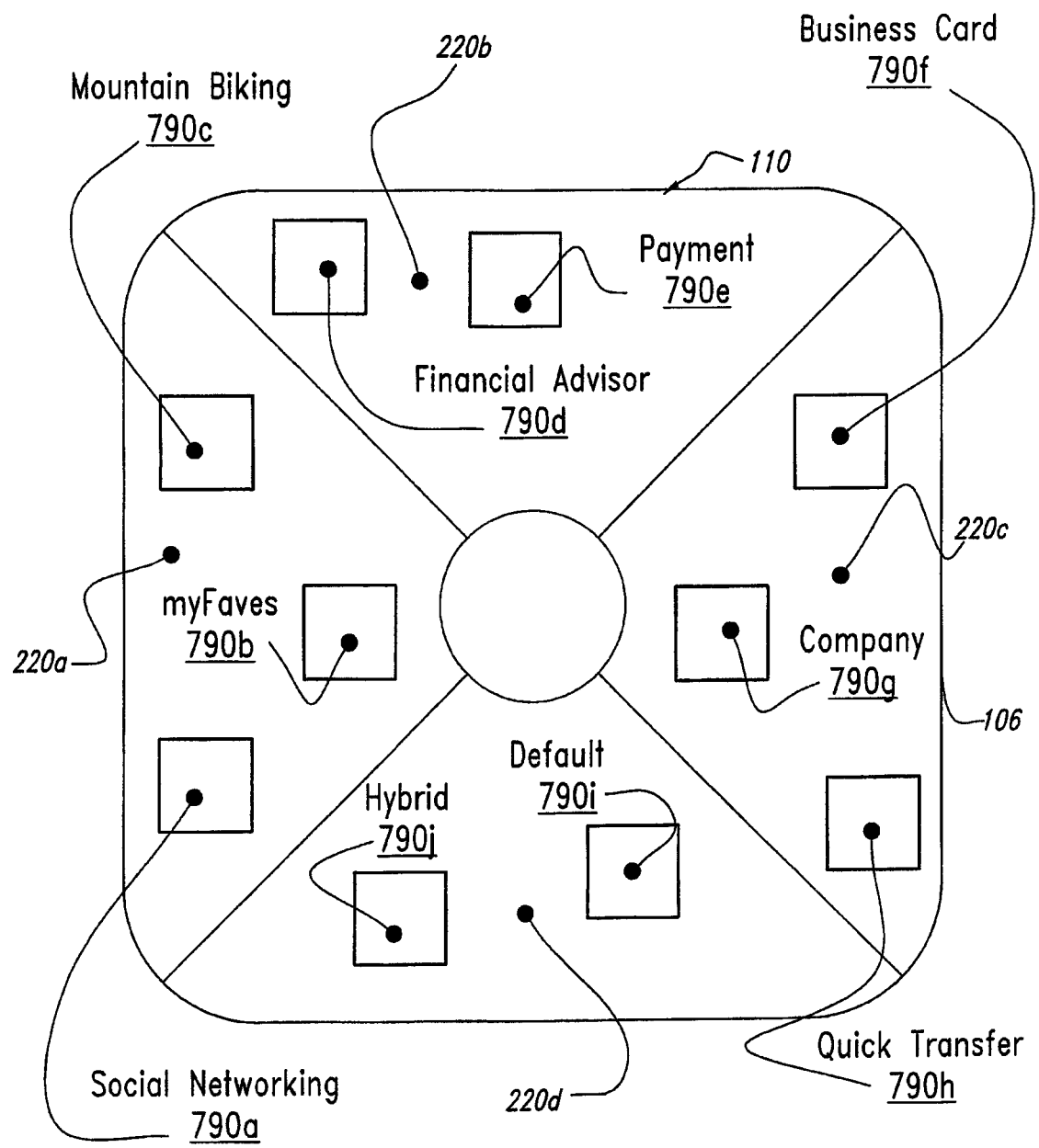
FIG. 7 illustrates context associations of data in more detail.

FIG. 7 illustrates the root interface 110 generated by the system and containing context associations 790a-j within the relationship associations. More specifically, the context associations are identified as Social Networking 790a, myFaves 790b, Mountain Biking 790c, Financial Advisor 790d, Payment 790e, Business Card 790f, Company 790g, Quick Transfer 790h, Default 790i, and Hybrid 790j. In the illustrated embodiment of FIG. 7, context associations are displayed such that they are contained in individual relationship associations 220a-d. In other embodiments, however, the context associations 790a-j may be displayed differently.

When a context association 790a-j is selected by a user, the system may transmit a predefined set of data to another device without the user having to select data from a secondary interface. For example, a user of the mobile device 100 may maintain a profile on a social networking website, such as MySpace®, Facebook®, etc. The Social Networking association 790a may be linked to specific types of data that identify the user in the social network website (e.g., a URL, a user name). A user could therefore automatically transmit the social networking identification data to another user by selecting the Social Networking association 790a. An individual who received the data would be able to use it to find the transmitting user's social networking profile. As another example, the user may participate in a cellular services plan, such as T-Mobile® myFaves®. The myFaves association 790b may be linked to a list of those individuals that are in the myFaves group defined by the user. By selecting the myFaves association 790b, the user may transmit the identities of the individuals in the user's MyFaves group to other users. As another example, the user may select the mountain biking context association 790h to transmit specific files to another mobile device, that are related to mountain biking content on the user's device. The user may have associated a set of photos, a route map, and a list of bike components that the user would like to sell with the mountain biking context association. When the user selects the mountain biking context association, the associated files are automatically transmitted to the other device. As still another example, the business card context association 790f may be selected by the user to transmit to another device specific pieces of information that may normally be found on a business card, such as a name, a company name, a number, an e-mail address, as well related material that may not be typically found on a business card, such as marketing materials and a price list. When the user selects the business card context association, the associated files are automatically transmitted to another device.

In some embodiments, rather than causing the immediate transmission of data, the selection of a context association 790 by a user causes the system to present a secondary user interface on the display. The system may allow a context association to be configured such that a user always is presented with a secondary user interface when a context association is selected, or a user may be allowed to reach a secondary user interface associated with any context association by a particular action associated with the context association (e.g., by selecting and holding the context association for an extended period of time). The secondary user interface typically contains a subset of the information that the user would otherwise be able to access if he or she selected a relationship association and was presented with a secondary user interface. That is, the data typically accessible from the relationship association would be filtered to more closely match the anticipated contents of the context association.

Figure 8:
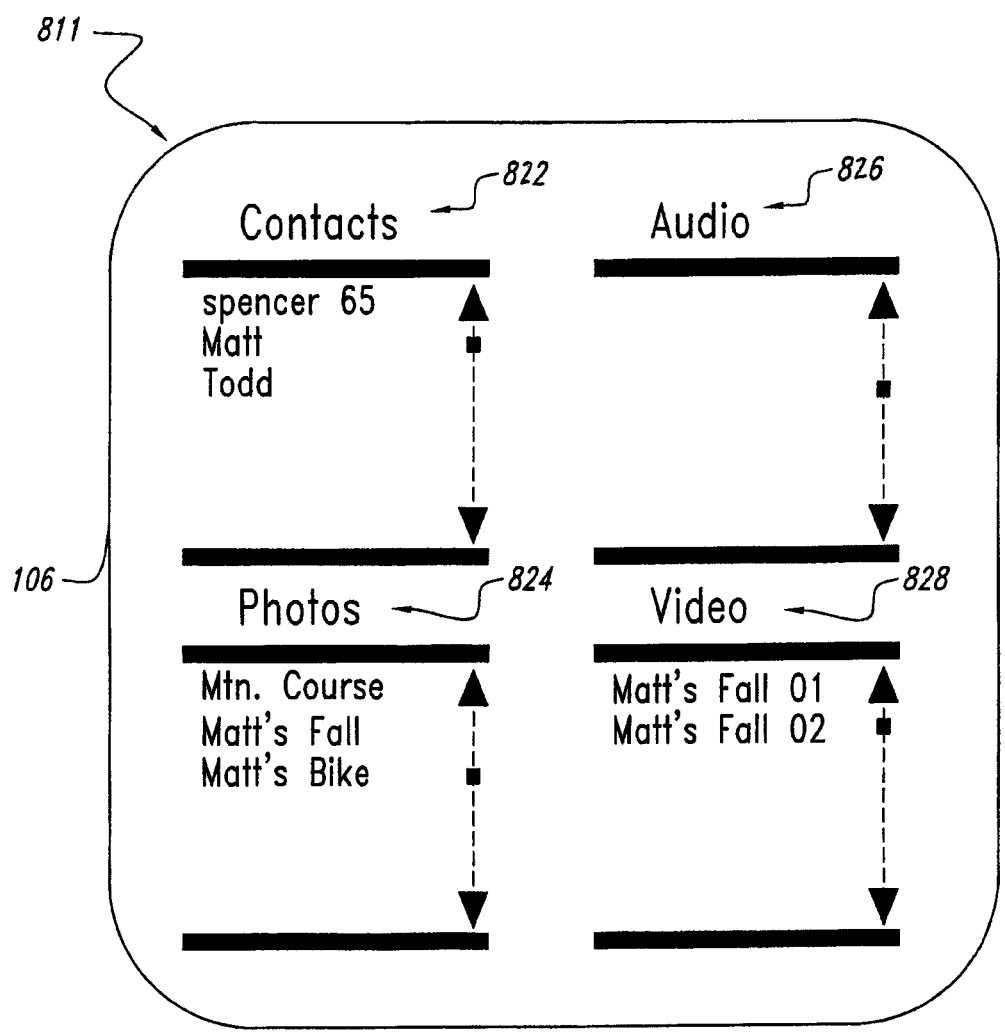
FIGS. 8, 9, 10A and 10B illustrate various secondary interfaces that are presented at the mobile-device display when a context association is selected.

FIGS. 8-10B illustrate representative secondary user interfaces presented by the system after the selection of a context association. FIG. 8 illustrates an embodiment of a secondary user interface 811 that is presented by the system when the Mountain Biking association 790c is selected. The user of the mobile device 100 may be an avid mountain biker; the secondary interface 811 may accordingly present data relating exclusively to friends who engage in mountain biking and/or other media related to mountain biking. In this example, the secondary interface 811 presents a Contacts menu 822, a Photos menu 824, an Audio menu 826, and a Video menu 828. Each menu only presents a subset of the data that might be made accessible by the system if the user were to select the Social association 220a. Note that certain menus may not contain data, if no data is present on the mobile device that matches the subject matter of the context association. For example, the Audio menu 826 does not contain data related to mountain biking.

Figure 9:
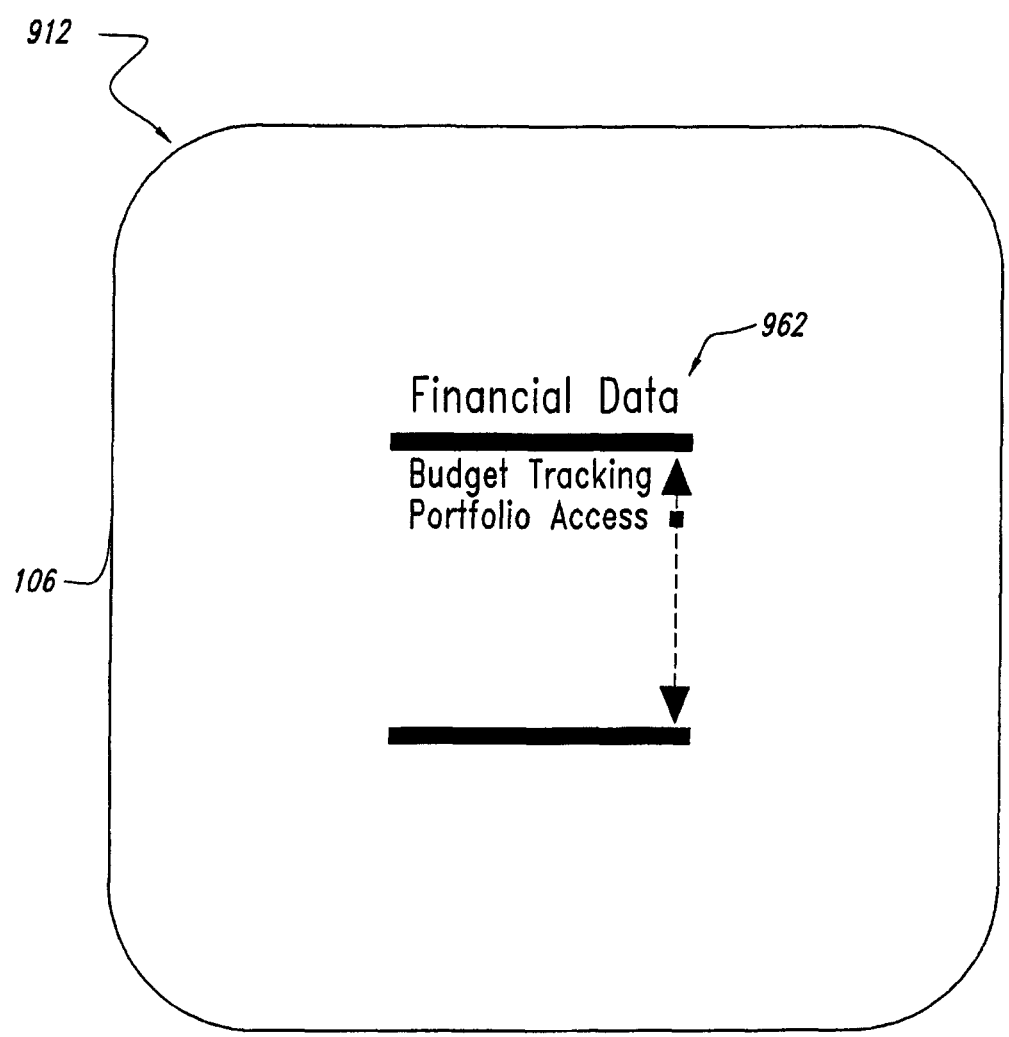

FIG. 9 illustrates an embodiment of a secondary user interface 912 that is presented by the system when the Financial Advisor association 790d is selected. In this embodiment, the Financial Advisor association 790d may contain data that the user is willing to exchange with a financial advisor. Accordingly, the secondary interface 912 displays a Financial Data menu 962 containing relevant personal financial data. The data displayed in the Financial Data menu is a subset of the personal data that is accessed by the selection of the Personal association 220b, such as is depicted in the secondary user interface of FIG. 4.

Figure 10A:
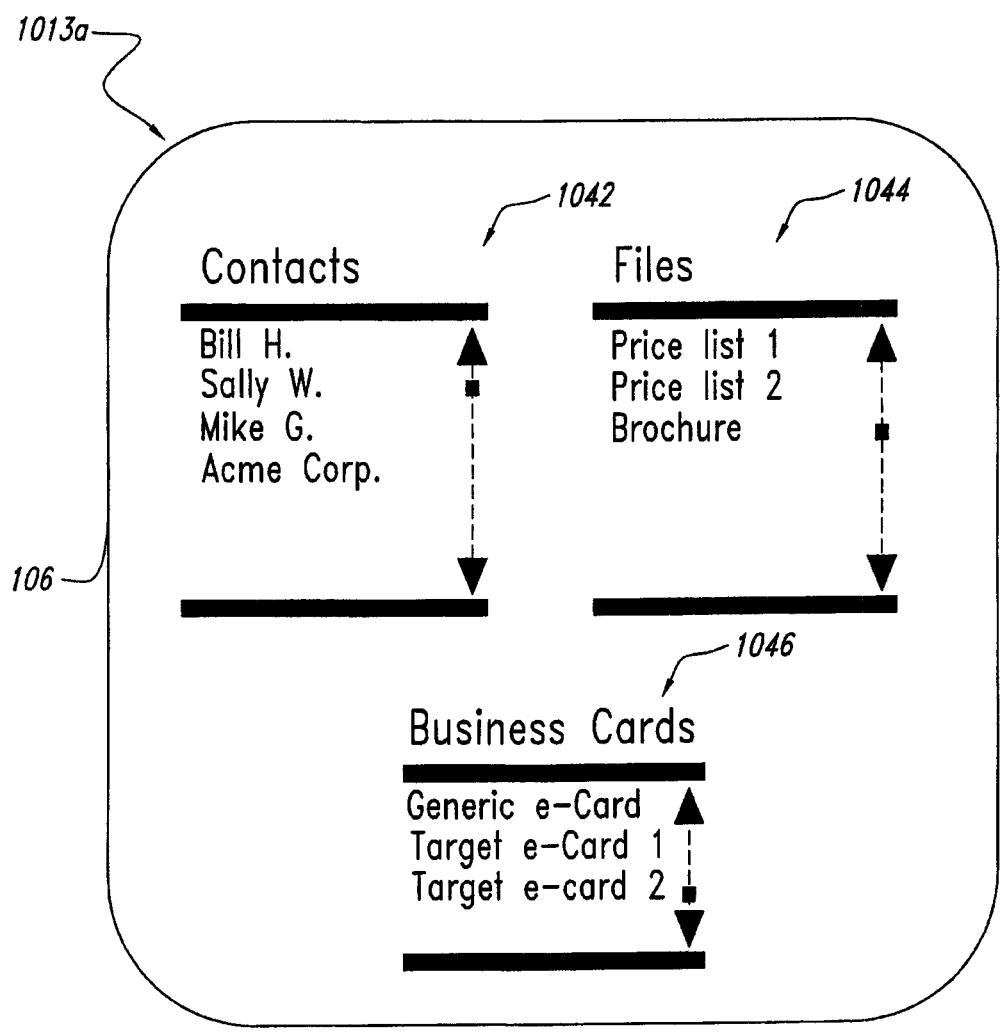
Figure 10B:
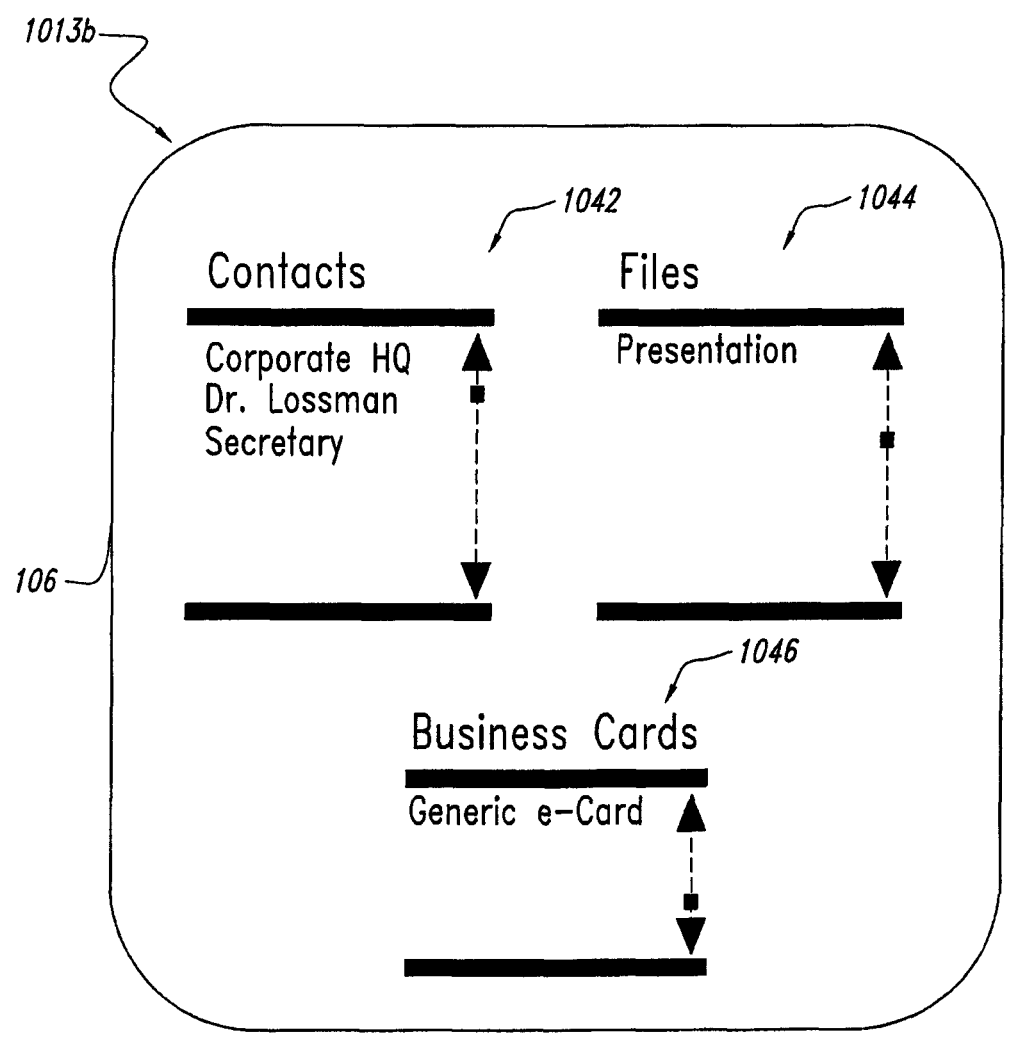

FIG. 10A illustrates an embodiment of a secondary user interface 1013a that is presented by the system when the Client association 790f is selected, and FIG. 10B illustrates an embodiment of a secondary user interface 1013b that is presented by the system when the Company association 790g is selected. The secondary interfaces 1013a and 1013b include a Contacts menu 1042, a Files Menu 1044, and a Business Cards menu 1046. In FIG. 10A, the secondary interface 1013a displays contacts, files, and business cards that are appropriate for a user to exchange with business clients. The secondary interface 1013a could also be targeted to a specific client. For example, the user of the mobile device 100 could create a context association for each client. In FIG. 10B, the secondary interface 1013b displays data that is appropriate for a user to exchange with coworkers and/or other people associated with a particular company. In some embodiments, a user may employ such segregated secondary interfaces 1013a and 1013b to prevent business sensitive data from being inadvertently selected and transmitted to a client.

Data Transfer Using Relationship and/or Context Associations

As mentioned above, mobile devices may employ root user interfaces and/or secondary user interfaces to facilitate a user's selection of data to exchange with other mobile devices. In general situations, a user may select a relationship association at the root interface to characterize the type of data transfer that is to occur. Based on the selected relationship association, the system will generate a secondary interface that presents data corresponding to that association. A user may then select data from the secondary interface and may transmit the selected data to another mobile device. In specific situations, a user may select a context association at the root interface that pertains to the type of data transfer that will occur. The selection of the context association will cause the system to automatically transmit selected data to another mobile device, or, in some circumstances, the selection of the context association will cause the system to generate and display a secondary interface with data corresponding to that association. A user may then select data from the secondary interface and may transmit the selected data to another mobile device. As mentioned above, in some embodiments data transmission may begin automatically without any further intervention by the user. In other embodiments, data transmission may occur semi-automatically, by a user entering a command at the keypad 102 or at a touchscreen to initiate data transfer.

Figure 11A:
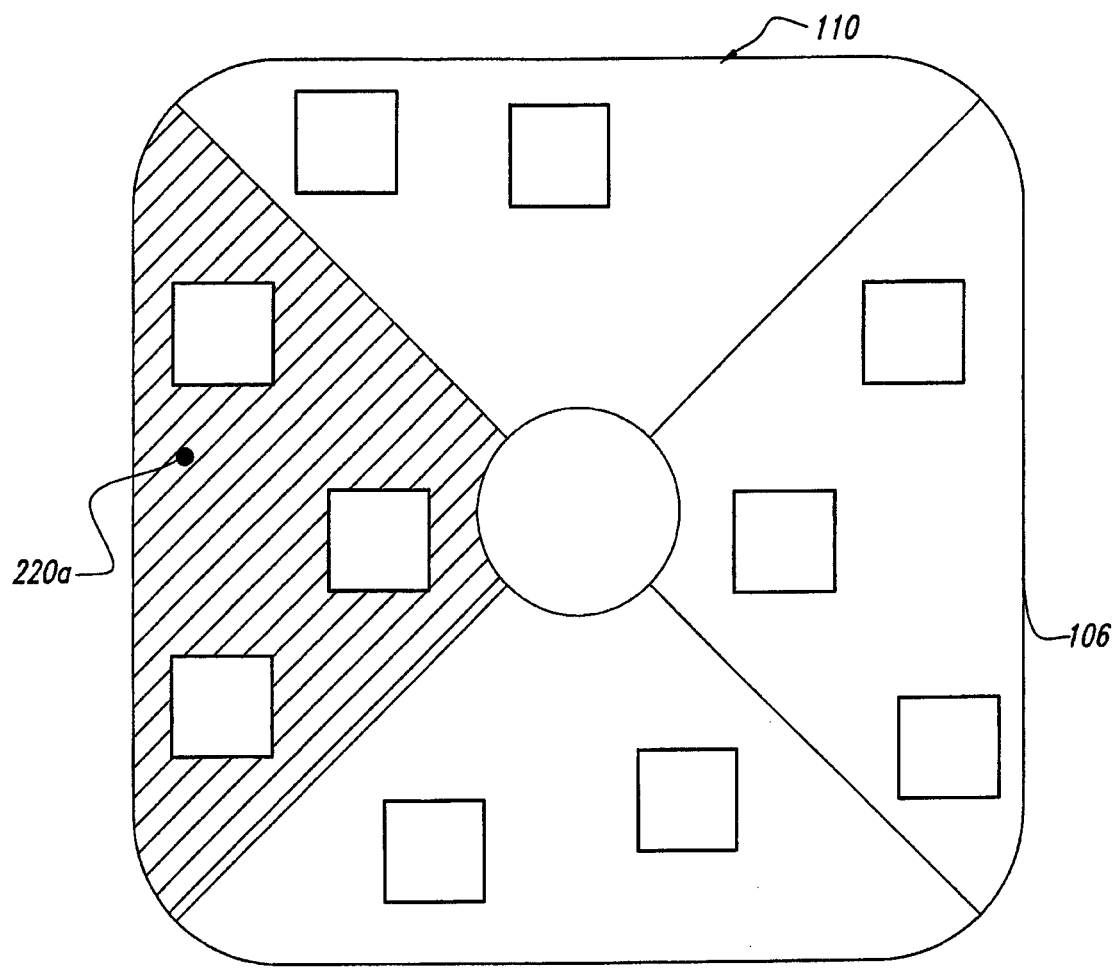
FIGS. 11A-F illustrate data transfer between mobile devices using relationship and context associations of data.
Figure 11B:
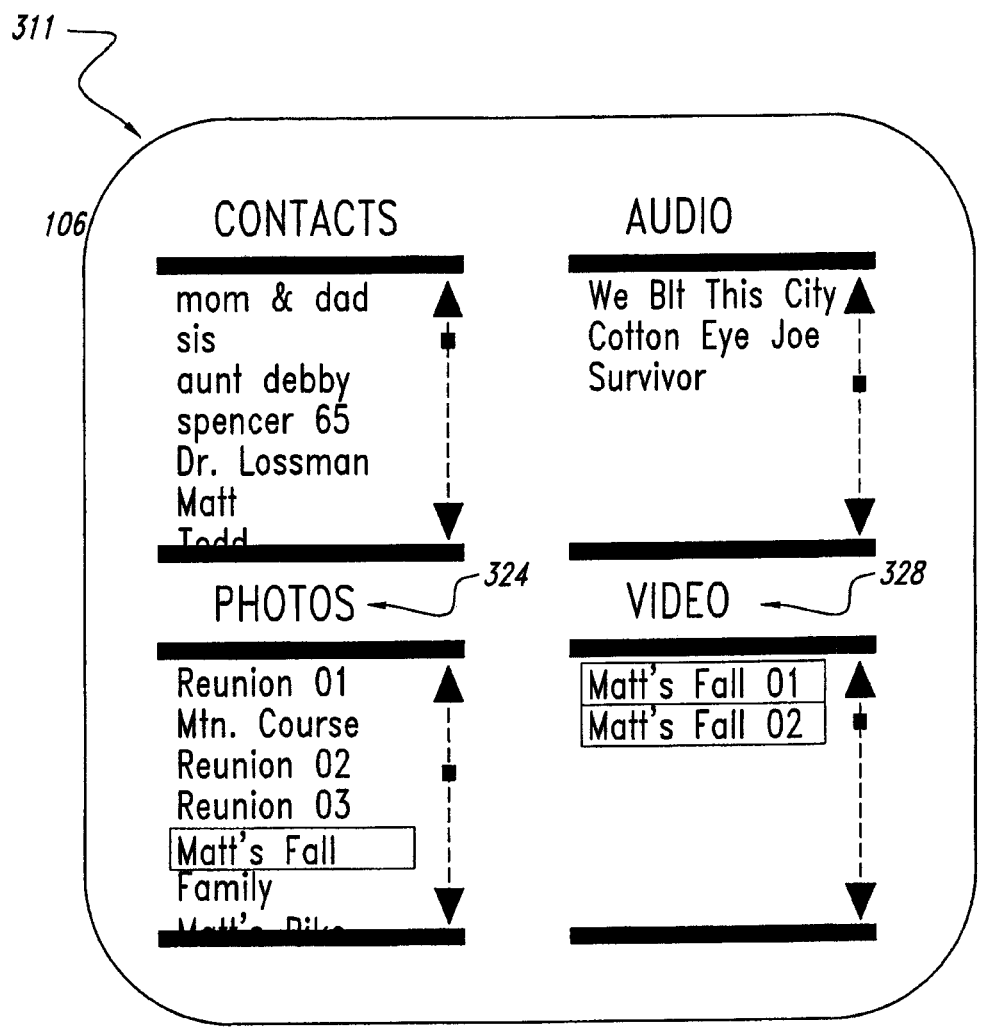
Figure 11C:
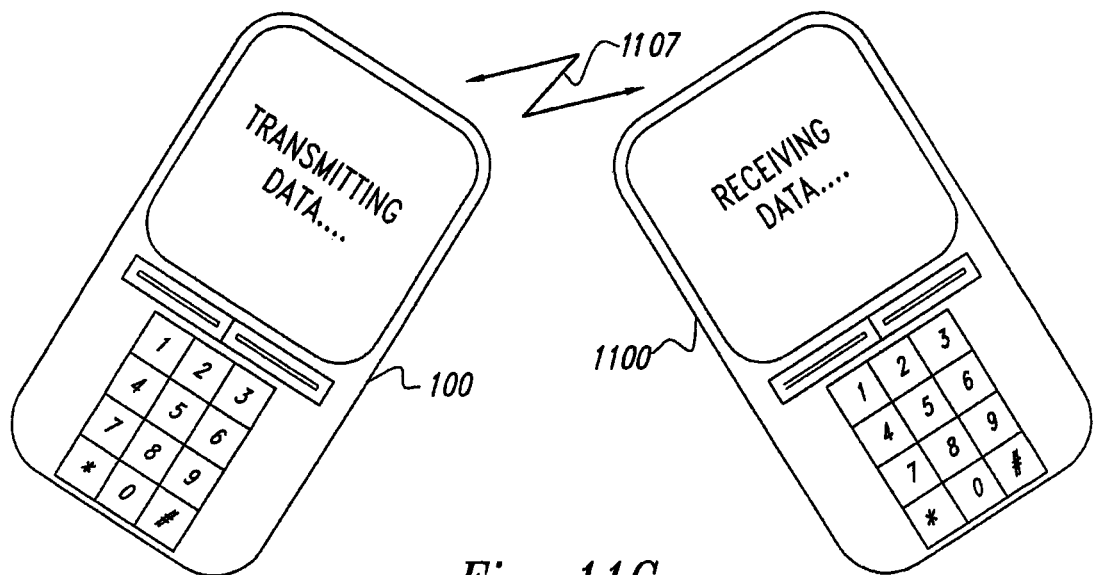
Figure 11D:
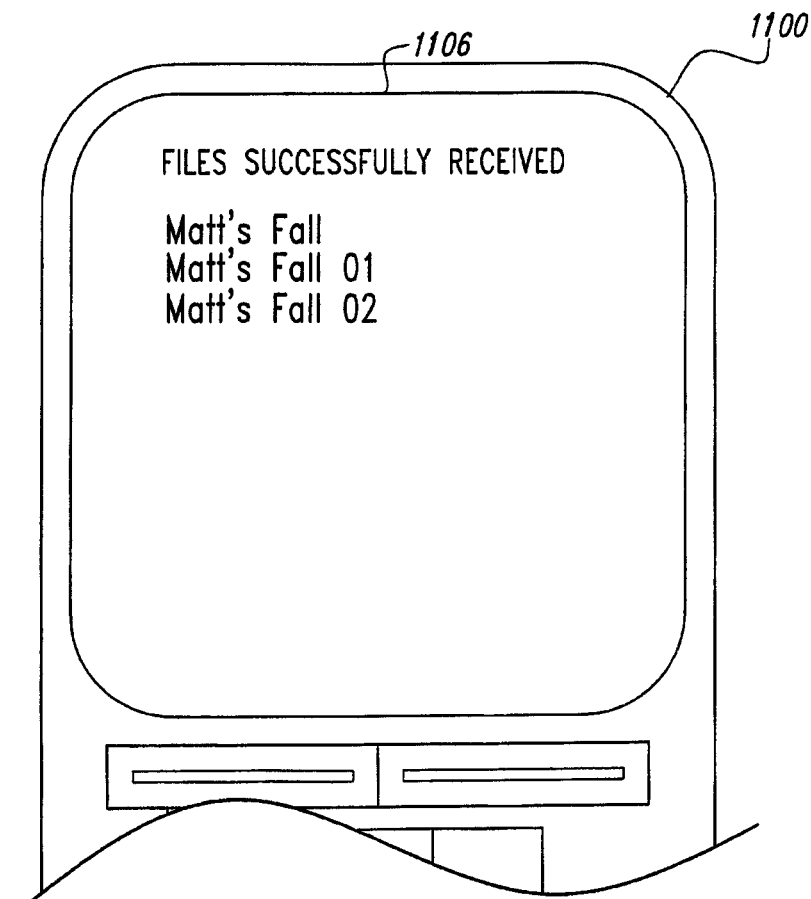

FIGS. 11A-D illustrate the wireless transfer of data using a relationship association. In FIG. 11A, a user has selected the Social association 220a of the root interface 110. In FIG. 11B, the secondary interface 311 is presented by the system and the user has selected the files "Matt's Fall," "Matt's Fall 01," and "Matt's Fall 02," as reflected by the highlighting of each of those files. In FIG. 11C, the user has initiated the transfer of the selected files, and a wireless link 1107 (e.g., an NFC, Bluetooth, or Wi-Fi link) is used to transfer the selected files to a mobile device 1100. In FIG. 11D, the mobile device 1100 has received the selected files and a display 1106 of the mobile device 1100 indicates that the selected files have been successfully received.

Figure 11E:
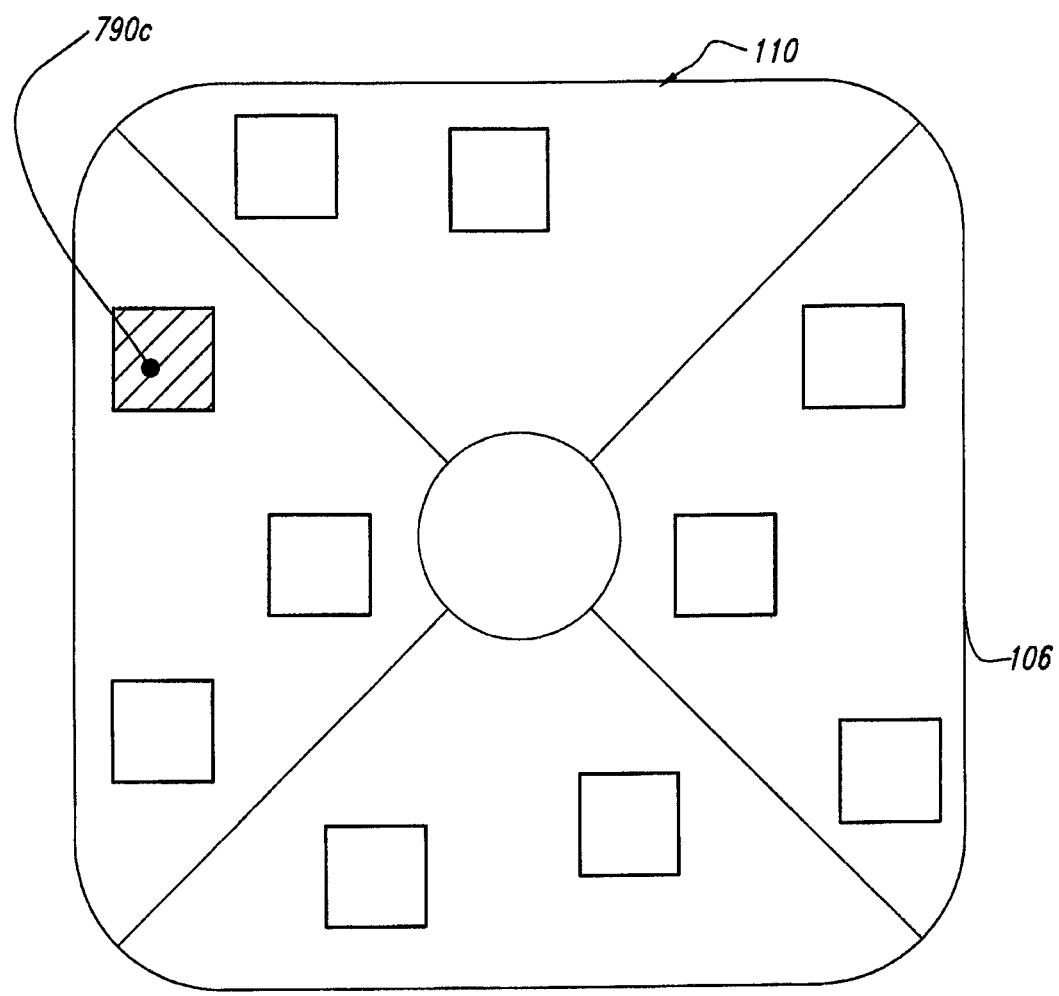
Figure 11F:
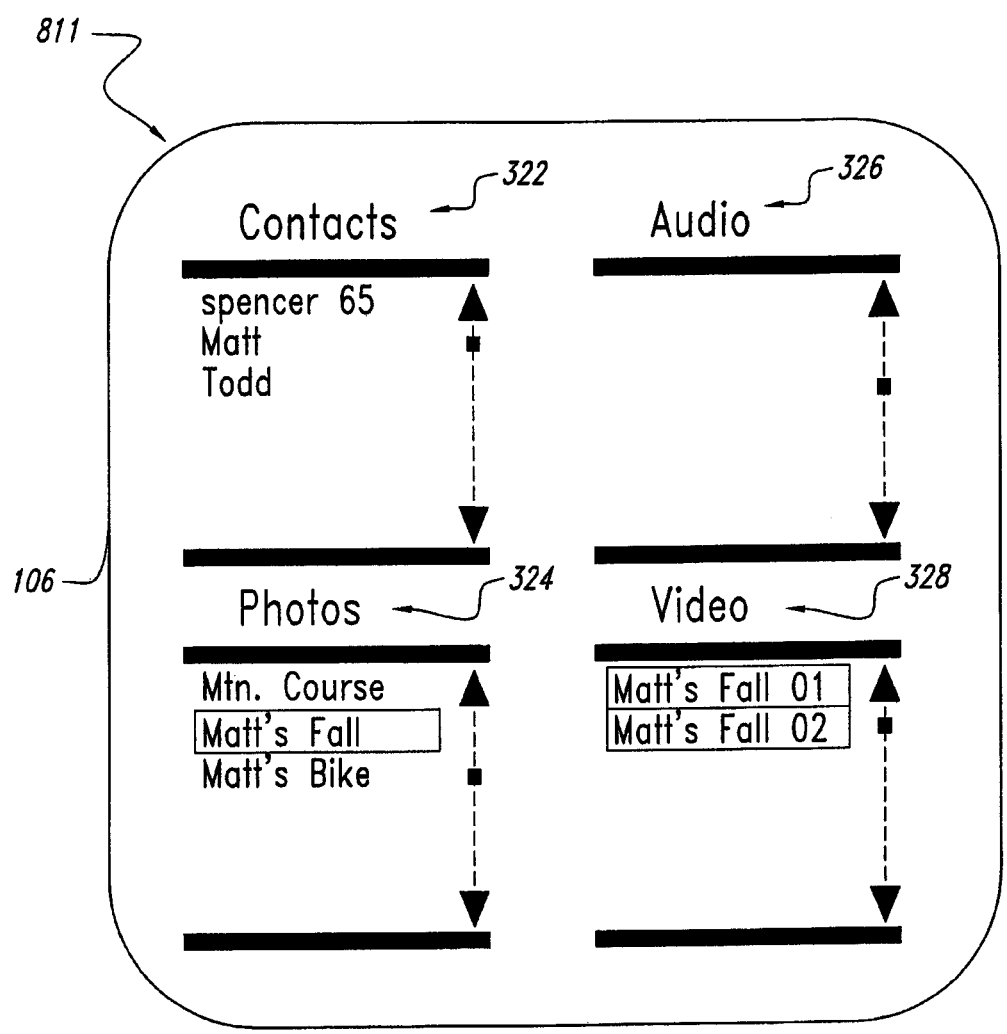

As an alternative example, FIGS. 11E and 11F illustrate the wireless transfer of data using a context association. In FIG. 11E, a user has selected the Mountain Biking association 790c of the root interface 110. The selection of the Mountain Biking 790c association may cause the automatic transmission of data associated with that association. Alternatively, if the user selects and holds the Mounting Biking association, a secondary interface 811 may be presented to the user as depicted in FIG. 11F. In FIG. 11F, the secondary interface 811 is presented by the system containing all of the data that is associated with the Mountain Biking association. The user may then select a subset of the data to transmit, such as the files "Matt's Fall," "Matt's Fall 01," and "Matt's Fall 02" that are highlighted in the figure. These files may then be transmitted in a similar manner to that shown in FIGS. 11C and 11D. Note that the secondary interface 811 contains fewer filenames than the secondary interface 311 because it is a subset of the Social association 220a.

Although generally described in the context of transmitting data to another device, relationship and context associations may also be employed when receiving data. In some embodiments, in addition to transmitting data to a receiving device, a transmitting device may also transmit an indication of a particular relationship and/or context association that was indicated at the transmitting device. Referring to FIGS. 11A-F, for example, the receiving mobile device 1100 may use the received relationship and/or context association to correlate the data it receives with the Social association 220a and/or the Mountain Biking association 790c. The user of the mobile device 1100 may then access the received data according to that association. Alternatively, a user of the receiving device 1100 may manually identify a relationship and/or context association when data is received. For example, in some embodiments the user of the mobile device 1100 may select a particular relationship and/or context association from a list of associations that are generated by the system. When the mobile device 1100 receives the data, it may automatically be associated with the selected relationship and/or context.

CONCLUSION

From the foregoing, it will be appreciated that specific, representative embodiments have been described herein for purposes of illustration, but that various modifications may be made to these embodiments including adding and/or eliminating particular features. For example, although shown as sectors and boxes in the figures, graphical representations of relationship associations and context associations may have different shapes, sizes, and configurations. In addition, in some embodiments a mobile device may not include relationship associations and a root user interface may only display context associations. In other embodiments, a mobile device may not include context associations and a root user interface may only display relationship associations. Further, while advantages associated with certain embodiments have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method of identifying data to transmit from one mobile device to another mobile device, the method comprising:
    presenting a root user interface on a display of the mobile device to a user,
        wherein the root user interface has a plurality of graphical indicators that each correspond to a type of relationship between the user of the mobile device and another individual, and
        wherein each of the plurality of graphical indicators also have an associated set of data that is related to the corresponding type of relationship;
    receiving a selection from the user of one of the plurality of graphical indicators;
    presenting a secondary user interface on the display of the mobile device to the user,
        wherein the secondary user interface corresponds to the graphical indicator selected by the user and displays the associated set of data that is related to the type of relationship reflected by the selected graphical indicator,
        wherein the associated set of data includes at least two data items that are selectable for transmission to another mobile device, and
        wherein the associated set of data that is related to the type of relationship is determined by analyzing the contents of the set of data;
    and receiving a selection from the user of a data item of the displayed set of data for transmission to a mobile device of an individual having the type of relationship with the user reflected by the selected graphical indicator.

2. The method of claim 1, further comprising wirelessly transmitting the selected data item of the displayed set of data to the mobile device of the other individual.

3. The method of claim 2, wherein the selected data item of the displayed set of data is automatically transmitted after selection.

4. The method of claim 2, wherein the selected data item of the displayed set of data is transmitted after receiving a confirmation from the user.

5. The method of claim 1, wherein the type of relationship comprises social, personal, and business relationships.

6. The method of claim 1, wherein the type of relationship includes a default relationship.

7. The method of claim 1, wherein the graphical indicators comprise radial sectors on the display.

8. A method of identifying data to transmit from one mobile device to another mobile device, the method comprising:
    presenting a root user interface on a display of a mobile device to a user,
        wherein the root user interface has a plurality of display sections that each correspond to a type of relationship between the user of the mobile device and another individual, and
        wherein each of the plurality of display sections represents a grouping of data stored on the mobile device that is related to the type of relationship;
    presenting a graphical indicator representing a contextual association on at least one of the plurality of display sections,
        wherein the graphical indicator is associated with a subset of data selected from the grouping of data corresponding to that display section, and
        wherein the subset of data that is selected from the grouping of data is determined by analyzing the contents of the grouping of data;
    receiving an input from the user corresponding to a selection of the context association; and
    transmitting the subset of data associated with the selected context association to a mobile device of an individual having the type of relationship reflected by the display section of the selected context association.

9. The method of claim 8, wherein transmitting the subset of data is carried out wirelessly.

10. The method of claim 8, wherein transmitting the subset of data occurs without any further user intervention.

11. The method of claim 8, wherein the type of relationship is a social relationship and the contextual association is a social networking context, and wherein the subset of data pertains to the social networking context.

12. The method of claim 8, wherein the type of relationship is a business relationship and the contextual association is a business card, and wherein the subset of data pertains to the business card.

13. The method of claim 8, wherein the type of relationship is a personal relationship and the contextual association is an electronic payment, and wherein the subset of data pertains to the electronic payment.

14. The method of claim 8, wherein the plurality of display sections are radial sectors on the display.

15. The method of claim 14, wherein the graphical indicator of the contextual associations comprises an icon.

16. A system for incorporation in a mobile device to allow a user to identify data to transmit from the mobile device to another mobile device, the system comprising:
    a memory storing computer-executable instructions of:
        an interface component configured to:
            present a root user interface on a display of a mobile device to a user,
                wherein the root user interface has a plurality of display sections that each correspond to a type of relationship between the user of the mobile device and another individual, and
                wherein each of the plurality of display sections represents a grouping of data stored on the mobile device that is related to the type of relationship; and
            present a graphical indicator representing a contextual association on at least one of the plurality of display sections,
                wherein the graphical indicator is associated with a subset of data selected from the grouping of data corresponding to that display section, and wherein the subset of data is determined by programmatically analyzing the contents of the grouping of data; and an input component for receiving an input from the user corresponding to a selection of the context association, wherein the input component is configured to retrieve the subset of data associated with the selected context association and to provide the retrieved subset of data for transmission to a mobile device of an individual having the type of relationship of the display section of the selected context association; and a processor for executing the computer-executable instructions stored in the memory.

17. The system of claim 16, wherein the transmission of the subset of data is carried out wirelessly.

18. The system of claim 16, wherein the transmission of the subset of data occurs without any further user intervention.

19. The system of claim 16, wherein the type of relationship is a social relationship and the contextual association is a social networking context, and wherein the subset of data pertains to the social networking context.

20. The system of claim 16, wherein the type of relationship is a business relationship and the contextual association is a business card, and wherein the subset of data pertains to the business card.

21. The system of claim 16, wherein the type of relationship is a personal relationship and the contextual association is an electronic payment, and wherein the subset of data pertains to the electronic payment.

22. The system of claim 16, wherein the plurality of display sections are radial sectors on the display.

23. The system of claim 22, wherein the graphical indicator of the contextual associations comprises an icon.

\* \* \* \* \*